US008595769B2

(12) United States Patent
Matz

(10) Patent No.: US 8,595,769 B2
(45) Date of Patent: Nov. 26, 2013

(54) SYSTEM AND METHOD FOR PROVIDING A PERSONALIZED CHANNEL

(75) Inventor: William Randolph Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1208 days.

(21) Appl. No.: 10/726,727

(22) Filed: Dec. 2, 2003

(65) Prior Publication Data

US 2005/0120369 A1 Jun. 2, 2005

(51) Int. Cl.
*G06F 3/00* (2006.01)

(52) U.S. Cl.
USPC .................. 725/46; 725/44; 725/45; 725/47

(58) Field of Classification Search
USPC ....................................................... 725/20, 44
See application file for complete search history.

(56) References Cited

U.S. PATENT DOCUMENTS

| | | | | |
|---|---|---|---|---|
| 5,038,211 | A | 8/1991 | Hallenbeck | 358/142 |
| 5,559,548 | A | 9/1996 | Davis et al. | 348/6 |
| 5,630,119 | A | 5/1997 | Aristides et al. | 395/601 |
| 5,818,438 | A | 10/1998 | Howe et al. | 345/327 |
| 5,892,508 | A | 4/1999 | Howe et al. | 345/327 |
| 5,917,481 | A | 6/1999 | Rzeszewski et al. | 345/327 |
| 5,983,227 | A | 11/1999 | Nazem et al. | 707/10 |
| 6,076,094 | A | 6/2000 | Cohen et al. | 707/104 |
| 6,128,009 | A * | 10/2000 | Ohkura et al. | 725/46 |
| 6,172,674 | B1 | 1/2001 | Etheredge | 345/327 |
| 6,252,586 | B1 | 6/2001 | Freeman et al. | 345/321 |
| 6,314,577 | B1 | 11/2001 | Pocock | 725/93 |
| 6,486,920 | B2 * | 11/2002 | Arai et al. | 348/563 |
| 6,701,523 | B1 * | 3/2004 | Hancock et al. | 725/25 |
| 7,100,183 | B2 * | 8/2006 | Kunkel et al. | 725/34 |
| 7,103,905 | B2 * | 9/2006 | Novak | 725/46 |
| 7,475,417 | B2 * | 1/2009 | Marsh | 725/58 |
| 2002/0059586 | A1 * | 5/2002 | Carney et al. | 725/35 |
| 2003/0066090 | A1 * | 4/2003 | Traw et al. | 725/114 |
| 2003/0093792 | A1 * | 5/2003 | Labeeb et al. | 725/46 |
| 2003/0154473 | A1 * | 8/2003 | Shin | 725/28 |
| 2003/0159145 | A1 * | 8/2003 | Kaltz | 725/46 |
| 2004/0216156 | A1 * | 10/2004 | Wagner | 725/39 |
| 2004/0216158 | A1 * | 10/2004 | Blas | 725/46 |
| 2005/0044565 | A1 * | 2/2005 | Jerding et al. | 725/37 |
| 2005/0047752 | A1 * | 3/2005 | Wood et al. | 386/83 |
| 2006/0277564 | A1 * | 12/2006 | Jarman | 725/25 |

OTHER PUBLICATIONS

"The Wink System," www.wink.com, date unknown, 5 pages.
"allNet Devices:—Report: Interactive TV Soon to Become Direct Marketing Tool," www.allnetdevices.com, Feb. 21, 2010, 14 pages.

(Continued)

*Primary Examiner* — Jun Fei Zhong
(74) *Attorney, Agent, or Firm* — Guntin & Gust, PLC; Ralph Trementozzi

(57) ABSTRACT

Systems and methods of presenting channel content in a distributed network having a client device and a server device, the method comprising the acts of evaluating tagged content, e.g., from the server device and creating a personalized channel at the client device. The personalized channel comprises content from two or more predetermined channels, i.e., channels received from the server device. Last, the system and method displays the content on the personalized channel. Also, systems and methods may be employed to display a personalized programming guide, using profile information to select a preferred subset of information to display such that the user is better able to discern desirable content.

17 Claims, 6 Drawing Sheets

(56) References Cited

OTHER PUBLICATIONS

Liberate Technologies, www.solutions.liberate.com, date unknown, 7 pages.
Respond TV, www.respondtv.com; date unknown, 4 pages.
Nielsen Media Research, "Who We Are and What We do," www.nielsenmedia.com, date: 2001, 4 pages.

* cited by examiner

SYSTEM AND METHOD FOR PROVIDING A PERSONALIZED CHANNEL

CROSS-REFERENCE TO RELATED APPLICATIONS

This application is related to U.S. patent application Ser. No. 10/177,561, titled System and Method for Providing Content in Place of Blocked Content, and U.S. patent application Ser. No. 10/176,939, titled System and Method for Monitoring Blocked Content, both of which were filed on Jun. 20, 2002, and assigned to the assignee of the present application, which applications are also hereby incorporated by reference in their entirety.

FIELD OF THE INVENTION

The present invention generally relates to networked media delivery systems. More particularly, the present invention relates to a method and system for identifying, selecting, and presenting content to a user of a television or other device that permits electronic viewing of content.

BACKGROUND OF THE INVENTION

Television networks have become a predominant means through which individuals receive media content, such as entertainment and information. As technology has improved, media content providers, using computers and televisions, have been able to provide more and more media content to larger and larger audiences. Broadcast, cable, and satellite television providers transmit television signals containing vast amounts of content, such as movies, news, special interest shows, audio, advertising, and home shopping programs, among others. It is not uncommon for cable and satellite television users to have over one hundred channels to choose from.

One problem with current approaches toward media content distribution is that there is too much content provided to any given user. In an attempt to maximize viewership and/or profits, content providers typically transmit content to as many users as possible, who are able to receive the content. From the user's perspective, the massive amount of transmitted content results in an "information overload" effect. Users are inundated with such a vast amount of content that effectively choosing what they most want to view becomes difficult. Users simply do not have time to view all of the content, and therefore must be selective. Moreover, for any given user, the content that streams into the user's home includes a large amount of content that the user will not want to watch.

Most computer and television users know a priori (i.e., before receiving it) of certain categories of content that they will not want to view based only on the type of content. For example, many users, particularly parents, do not want pornographic content to be an option for selection on their television or computer. As another example, many users may not want to view sports, while other users may know a priori that they only want to watch one sport, e.g., bowling. As another example, many users may know before hand that they will never choose to watch cooking shows. In short, television or viewing device users frequently know ahead of time of certain categories of media content that they will not want to view. Unfortunately, notwithstanding users' a priori knowledge, the receipt and filtering of content are difficult and time consuming.

One aid that has been developed to help the user sort through the vast number of channels and program options is a programming guide. A programming guide typically presents all available television options in a scrolling fashion across the TV screen. Programming guides are difficult to read and confusing because they simultaneously present too much information and too little information for a discriminating user. Programming guides present too much information because they provide descriptions for every item of available content, including unwanted content. The user typically must read through all the descriptions to determine his/her preferred content. So many channels are typically presented on a programming guide that a user could easily miss a desired show while reading all the options, many of which are unwanted. Programming guides present too little information for each available content item because the descriptions are necessarily short due to limited space and time in the guide. Programming guide descriptions are frequently not descriptive enough to allow a discriminating user to effectively determine whether any particular content item should be blocked.

It is with respect to these and other considerations that the present invention has been developed.

SUMMARY OF THE INVENTION

The present invention relates to systems and methods for filtering content received from a content provider. The systems and methods of the present invention further relate to using a stored profile and using such profile to filter the received content. Upon filtering the content, multiple different embodiments of the invention may be employed.

In one embodiment, the filtered content is used to display a personalized electronic programming guide. In essence, the electronic programming guide provides the user a personalized and/or abbreviated guide containing or displaying available programs that match or correlate to the user's stored profile. Such an electronic programming guide enables the user to quickly ascertain programs and or content that is available for viewing and fits the established profile.

In another embodiment, the filtered content using the established profile is used to create a personalized channel. The personalized channel is a mix of content received from the content provider that would normally be viewed on separate channels. In essence, the systems and methods of the present invention, of this particular embodiment, select content from different channels and display that content according to its time slot on one personalized channel. In other embodiments, the profile may be manipulated or maintained through manual options. Yet other embodiments perform this manipulation automatically. Further once created, this channel may also be displayed for the user on the electronic programming guide.

In accordance with particular embodiments, the present invention relates to systems and methods of presenting channel content in a distributed network having a client device and a server device, the method comprising the acts of evaluating tagged content, e.g., from the server device and creating a personalized channel at the client device. The personalized channel comprises content from two or more predetermined channels, i.e., channels received from the server device. Last, the system and method displays the content on the personalized channel.

In order to achieve the creation of the personalized channel, the system and method parses the tagged content to evaluate the tags or identifiers associated with the content; and repackages the content into the personalized channel. In another embodiment, upon parsing the tagged content, the personalized channel is created by redirecting selected content to the user.

In accordance with certain aspects, the present invention relates to a system and method that creates the personalized channel automatically through use of a profile, wherein the profile is a stored data structure identifying user preferences and wherein the evaluating act compares incoming tag information with the profile to determine which content to add to the new channel. The profile, in some embodiments, further comprises exclusion information such that content is not added to the personalized channel when tag information associated with the content identifies matches the exclusion information in the profile. The profile may also include preference information related to the type of content and the rating of the content. In some embodiments of the invention, the profile is created manually, while other embodiments employ an automatic profile generation feature based on historical data. Yet other embodiments automatically update the profile based on updated historical information.

In accordance with a particular embodiment, the personalized channel is manually created and updated. Further, in accordance with other aspects of the invention, two or more personalized channels may be created. Also, access to these separate personalized channels may be restricted, such that access codes or passwords may be required to view these channels.

In accordance with yet other aspects, the present invention relates to systems and methods for displaying a personalized programming guide. Certain embodiments involve the acts of receiving tag information prior to receiving associated content; evaluating tag information based on a stored profile of preferences; and displaying a personalized programming guide at the client device, wherein the personalized programming guide displays a preferred subset of available content. The preferred subset may match profile preferences or may be selected manually. Further, the preferred subset may include one or more personalized channels of content. These personalized channels may further be continuously viewed, e.g., always on top. Moreover, the personalized channels may always be displayed when the viewing device is first activated, or may be displayed in a particular order in the programming guide, for example, always first, second, etc.

The invention may be implemented as a computer process, a computing system or as an article of manufacture such as a computer program product. The computer program product may be a computer storage medium readable by a computer system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION

Embodiments of the present invention are described with regard to a number of associated figures. Embodiments generally provide methods and systems for evaluating incoming content and choosing/presenting content in specialized channels to users, such as television users. More specifically, embodiments provide unique methods and systems for parsing incoming content and automatically repackaging the content, at the client end, into personalized groups or channels based on predetermined user preferences. The predetermined user preferences are stored in the local client device, such as in a data structure referred to as a user profile.

Figure 1:
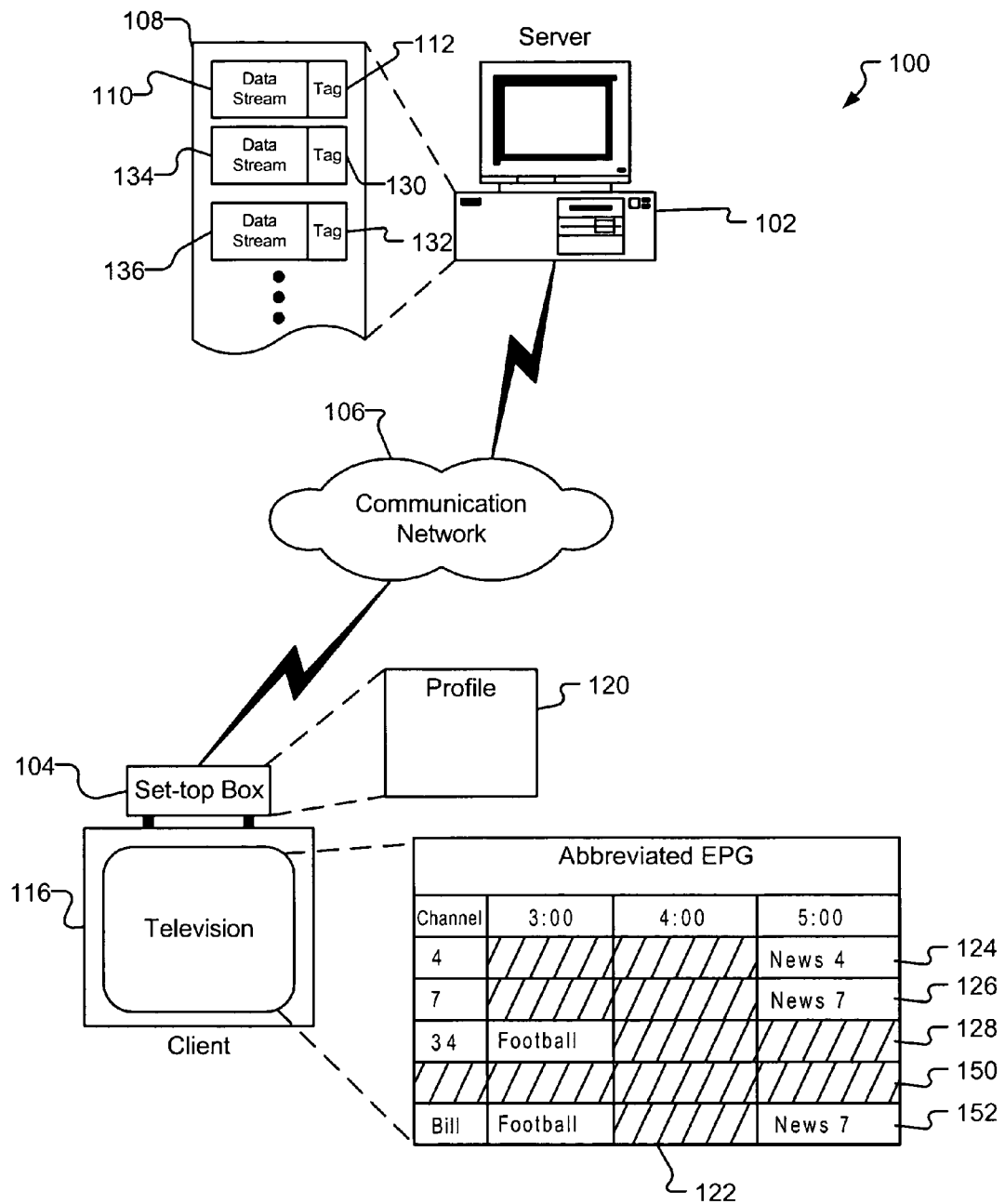
FIG. 1 is an exemplary operating environment implementing an embodiment of the present invention.

FIG. 1 illustrates an exemplary environment 100 employing an embodiment of the present invention. A server device 102 communicates with client device 104 via a communication network 106. Although not shown, server 102 may communicate with a number of other client devices as well. Server device 102 transmits media content, such as, but not limited to, video, audio, text, or executable programs, over the communication network 106 to be used by the client device 104. Client device 104 has an output device, such as a television screen 116, for presenting media content to the user.

The server device 102 has memory 108 that stores media content in the form of data streams 110, 134, and 136. The server device 102 also stores an associated tag, such as tags 112, 130, and 132, with each data stream 110, 134, and 136, respectively. Each of the tags 112, 130, and 132 may be unique from the others and may further be associated with user classifications such as user demographics or usage patterns based on generalized demographic information. The tagged data streams 110, 134, and 136 are, in an embodiment of the invention, transmitted to the client device 104. The tags are used by client device 104 as control elements to sort the programs into new channels of content. Each tag includes information that is descriptive of content category. In one embodiment, for example, the tags have content type information, content title information, viewer age information, viewer gender information, viewer income information, viewer location, content rating information, etc. More information regarding content tags, such as tags 112, 130 and 132 and their use may be found in copending U.S. patent application Ser. No. 10/176,939, titled System and Method for Monitoring Blocked Content, filed on Jun. 20, 2002, and incorporated above by reference.

In an embodiment, one or more data streams, such as 110, 134 and 136 are transmitted with tags, such as 112, 130, and 132 to the client device 104. The client device 104 sorts the data streams into one or more new channels of information. The process involves parsing the data streams, evaluating the tag information and comparing predetermined preferences or other identifying information and repackaging the data streams into new channels, i.e., new data streams. The client device 104 has access to a user profile 120 that is further used to determine the contents of the new channel(s).

In one embodiment, the client device 104 is a set-top-box (STB). In this embodiment, the communication network 106 may be a satellite television broadcast network and the server 102 may be a head-end of a cable service provider. The cable service provider generally broadcasts programming, advertising, "walled garden" merchandising offers, and other media content. As mentioned above, the media content is broadcasted in the form of data streams 110, 134, and 136 and associated tags 112, 130, and 132, respectively, to the STB 104. The STB 104 evaluates the tags 112, 130, and 132 and the STB user profile 120 to personalize the content delivered to the user. In an embodiment, the personalization of the content relates to the creation of new one or more new television channels and in another embodiment, the personalized content relates to a personalized or abbreviated programming guide 122.

The programming guide 122 is merely an example of an abbreviated and personalized programming guide that may be created and shown only to illustrate facets of such a programming guide. As shown, the programming guide 122 displays five rows of information, each relating to a channel. The first three rows 124, 126 and 128 relate to network channels received from the server 102 and the content to be displayed on these channels. However, as may be appreciated, the first two time slots, for 3:00 and 4:00 of rows 124 and 126 are not displayed. Similarly, the content for time slots 4:00 and 5:00 is not displayed for row 128. Such items are not displayed, in this example, since client 104 blocked such display in creating the programming guide based on the tag information for these items and the profile information 120. In this example, it is assumed that the profile information indicates that the user is not interested in the content that would normally be displayed in these time slots without such filtering.

Similarly, in the exemplary programming guide 122, row 150 indicates a channel has been completely blocked, such that the content, including the channel number is not displayed to the user. This may relate to a parental control or some other information located in the profile 120. In a particular embodiment of the present invention, new channels, such as the channel indicated by row 152 of programming guide 122, are created at the STB 104. Each new channel so created may have its own programming guide entry such that users can view the contents to be displayed on the new channel.

Many variations of the programming guide 122 are contemplated. For instance, in an embodiment, the programming guide scrolls through all the available channels. However, in such a case, the personalized channels are always viewable. In other embodiments, only predetermined sets of channels are shown, such as the personalized channels and some subset of the remaining available channels. In yet another embodiment, the abbreviated programming guide 122 may not be divided into time-slot columns, but instead simply lists the available content and the time it will be shown. In this case, the much of the grayed area may be used to display other relevant information.

While FIG. 1 depicts one type of client device, i.e., a television set top box (STB) 104, it is to be understood that other client devices exist and these clients may be any device operable to communicate via the communications network 106, and operable to receive a data stream, such as data stream 110 having a tag such as 112. By way of example, and not limitation, the client device 104 may be a personal digital assistant (PDA), a laptop computer, or a cellular telephone, among others. By way of further example, and not limitation, the communication network 106 may be wireless network, an Ethernet, a local area network (LAN), a wide area network (WAN), or a television broadcast network, among others.

Figure 2:
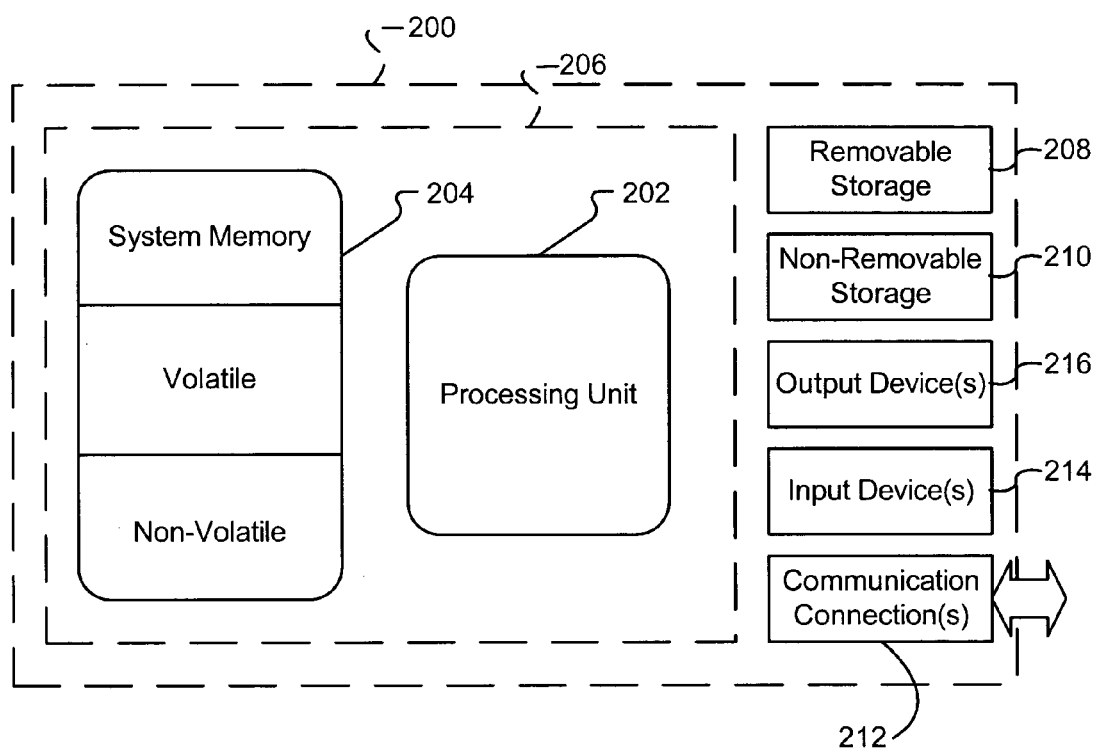
FIG. 2 is a computer system suitable for implementing an embodiment of the present invention.

FIG. 2 illustrates an exemplary system for implementing the invention with a computing device 200. That is, the server computer system 102 and the client device 104 are both, in their basic configurations, computer systems, such as exemplified by system 200. In a basic configuration, the computing device 200 typically includes at least one processing unit 202 and memory 204. Depending on the exact configuration and type of computing device, the memory 204 may be volatile (such as RAM), non-volatile (such as ROM, flash memory, etc.) or some combination of the two. This most basic configuration is illustrated in FIG. 2 by dashed line 206. Additionally, the device 200 may also have additional features and functionality. For example, the device 200 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. The memory 204, removable storage 208 and non-removable storage 210 are all examples of computer storage media. Computer storage media includes, but is not limited to, Random Access Memory (RAM), Read Only Memory (ROM), Electrically Erasable Programmable ROM (EEPROM), flash memory or other memory technology, CD-ROM, digital versatile disks (DVD) or other optical storage, magnetic cassettes, magnetic tape magnetic disk storage or other magnetic storage devices, or any other medium which can be used to store the desired information and which can be accessed by device 200. Any such computer storage media may be part of the device 200.

The device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The device 200 may also have input device(s) 214 such as keyboard, mouse, pen, voice input device, touch input device, remote control unit, etc. Output device(s) 216 such as a display, speakers, printer, etc. may also be included. All these devices are well known in the art and need not be discussed at length here.

In one particular embodiment, the computing device 200 is the set-top box (STB) 104. In this particular embodiment, the STB 104 provides a control interface through which a subscriber makes viewing selections by, e.g., using a remote control unit, a keyboard, or a control panel. In providing this interface, the STB 104 performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with the server device 102 over distribution network 106; (4) receives messages from a subscriber input device, such as a remote control unit; (5) translates video signals from a network-native format into a format that can be used by the viewing device; (6) inserts alphanumeric or graphical information (e.g., program guides, menus, etc.) into the video stream to overlay that information on the video image; and (7) provides graphic or audio feedback to the subscriber. Examples of commercially available set-top boxes 104 that satisfy these functions include an SA Explorer 2000 set-top box by Scientific Atlanta, a DCT-5000 set-top box by Motorola/General Instruments, and a Z12C set-top box by Zenith.

Figure 3:
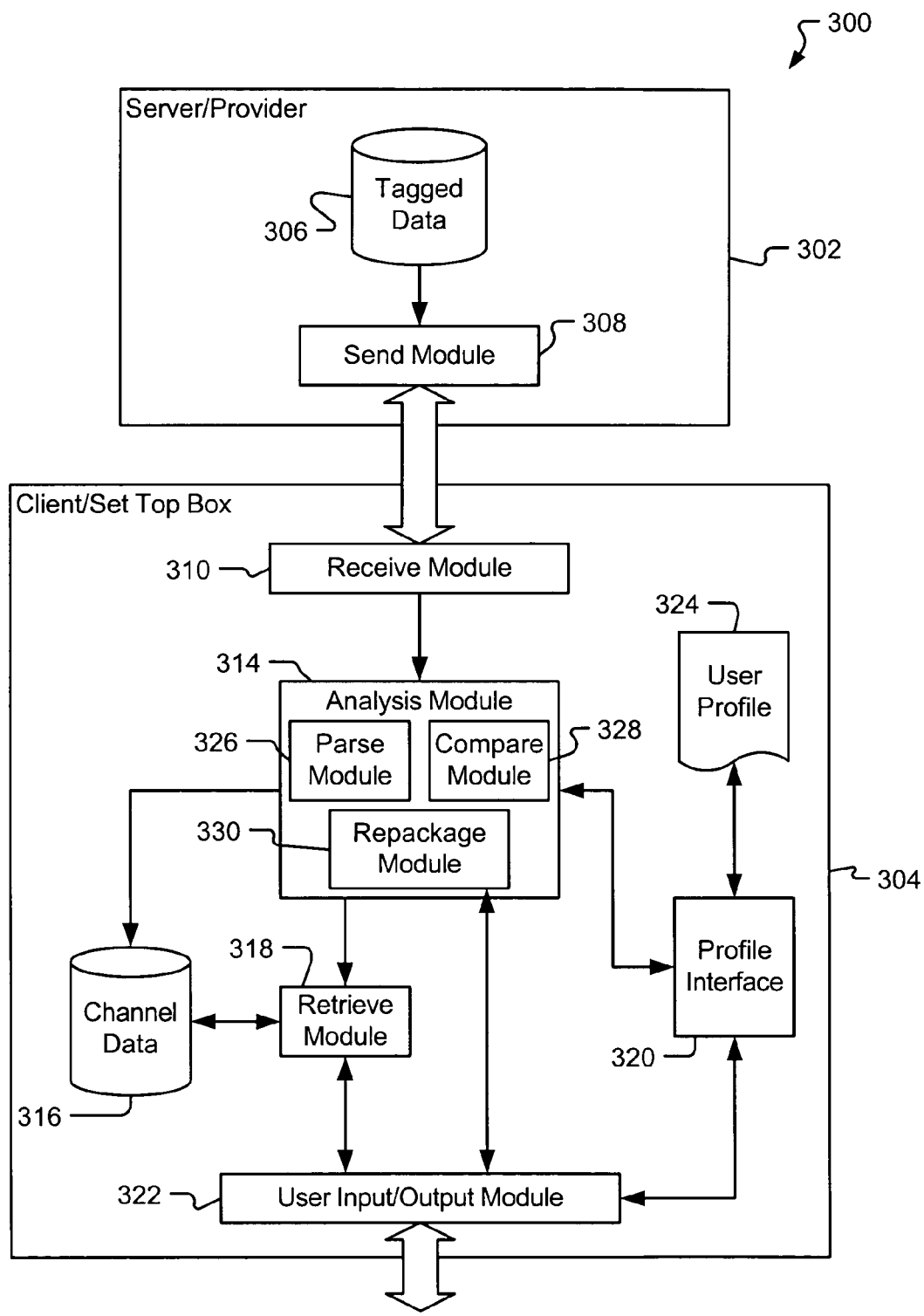
FIG. 3 is module diagram illustrating exemplary software, hardware, or firmware modules running in the computer system of FIG. 2.

FIG. 3 is a functional block diagram of a client-server system 300 employing an embodiment of the present invention. As discussed in more detail below, the client-server system 300 provides content to users of the system 300. The content may also include advertising and non-advertising content, including, but not limited to, news, games, programming and sports. A server 302 stores and transmits media content to a client 304, which represents any client system, such as system 104 (FIG. 1). Media content sent by the server 302 is in a tagged data stream format and is stored in a database 306. In an embodiment, the data streams relate to separate, predetermined channels of data, wherein each stream is a predetermined channel. In this instance, a predetermined channel is defined as a channel of information as determined by the server 302 or at some point in time prior to being received by the client system 304.

Data streams, or channel information located at the server 302 are tagged with tags corresponding to classifications of media content. In other embodiments, the tags may additionally or alternatively include other identifying information related to the content within a data stream. Classifications include, but are not limited to, content type or format (e.g., advertisement, movie, etc.), subject matter of the content, title, and rating (e.g., G, R, PG-13, etc.), among others. The tags allow the client device 304 to control the presentation of the content to the user in the form of new, personalized channels, and/or control the presentation of an abbreviated programming guide, such as programming guide 122 shown in FIG. 1.

The server module 302 represents the server, such as server 102 (FIG. 1) that stores and sends the tagged content 306. In an embodiment, the server module 302 tags the content, but this is not necessary since another module (not shown) may actually provide tagged content to the server 302. As may be appreciated, the data streams and associated tags in database 306 correspond to data streams 110, 134, and 136, as shown in FIG. 1. The server provider 302 also has a send module 308 for sending information to and from the client module 304. Sending the data streams to the client 304 may be done in any known manner. The server module may include many other modules that are not shown but are useful in communicating with the client module. For instance, the server 302 may also include a receive module for receiving information from the client device 304.

The client module 304, in an embodiment, is a set top box, such as set top box 104 shown in FIG. 1. The client or set top box 304 has a receive module 310 for receiving information from send module 310. The receive module 308 communicates with send module 308 of the server 302 in an ordinary or known manner using a known protocol. In particular, the receive module 310 receives a plurality of data streams. The data streams have both content and tag information related to the content. In other embodiments, the information received by the receive module 310 relates to programming guide information for upcoming content, i.e., data streams that are to be received at a later time.

The set top box for client module 304 further includes an analysis module 314. The analysis module receives information from receive module 312, such information includes the data streams from the send module 310. The analysis module 314 provides several functions. First, the analysis module supplies the channel data to a database 316 shown as channel data 316 in FIG. 3. In an embodiment, the analysis module 314 may further provide information directly to retrieve module 318. Also, the analysis module accesses and uses profile information 324, by interacting with a profile interface module 320.

The database 316 is used to store and/or buffer content and tag information. The database 316 stores data streams or channels as streams such that when a television or viewing device (not shown), which is communicably connected to the set top box, is operating, the user input/output module 322 interacts with the retrieve module 318 to access the desired channel or stream of data passing through the buffer 316. In other embodiments, the retrieve module 318 accesses the correct channel content directly from the analysis module 314.

The database 316 is generally not a database used to store separate content over time to allow the user to selectively sort through the database and choose programming content by tag. Instead, the database 316 is deemed an intermediate and temporary storage location, and the user selects content based on choosing a desired channel.

Retrieve module 318 is used to retrieve channel data 316 and to provide the same to user input/output module 322, which provides the content to a user of client box 304 and receives information from the client or user of client 304. The types of information provided to the user through user module 322 include not only actual channel content but also electronic programming guide content and other profile user interface elements to allow the user to enter new profile information.

The client device 304 further includes, therefore, a user profile 324. The user profile stores information entered by the user relating to preferred content to be viewed as well as preferred content to be blocked. The user profile 324 may contain yet other information regarding the user, such as demographic information or other preferences. The user profile may be created automatically or through the user input module in a manual manner.

Client 304 also includes a profile interface 320. The profile interface 320 is used to store information associated with one or more users of client device 304. The profile interface 320 interacts with the analysis module to retrieve relevant data from user profile and to provide the same to the analysis module 314. As may be appreciated, the profile interface provides the management and control of the user profile 324, and potentially other user profiles (not shown), such as in the case where a family of users interacts with set top box 304.

In operation, the analysis module 314 receives channels in many different forms, but primarily channels as determined by the service or content provider. The analysis module is able to parse the many different channels of data and recombine channels into new predetermined and personalized channels and store the same in database 316. Retrieve module 318 is then able to access channel data 316 to provide it to the user through user module 322.

In an embodiment, the analysis module 314 further contains a parse module 326, a compare module 328 and a repackage module 330. The parse module 326 is responsible for analyzing the incoming data streams and determining whether a certain portion of data is a tag or actual television content. If the data portion is a tag, then the information is passed to the compare module 328. The compare module 328 compares the received tag information with information in a user profile. The comparison enables the compare module to determine whether the associated content should be added to a personalized channel. In an embodiment, a plurality of channels may be created such that the comparison module 328 may need to compare a single tag of information against a plurality of user profiles.

Upon determining that data content should be added to a personalized channel, the repackage module 330 is responsible for adding this information to the new channel. When the user selects the personalized channel, the repackage module only displays the user's personalized content to be exhibited and all other content is blocked. In an embodiment, a plurality of channels is dedicated to the user's personalized channel content, such as channels previously used. Consequently, the process of adding content simply involves the transfer of portions of channel content from one channel to one of the predetermined, dedicated personalized channels. In other embodiments, the repackage module may either create a new channel for display based upon prior usage or user criteria, or supplant content received for an existing channel with the new personalized channel content. In such embodiments, the repackage module chosen content may then be loaded for display in a programming guide for the applicable user and sorted chronologically by time of day.

In another embodiment, the user may use the programming guide to manually select the content to be packaged in the personalized channel. In this embodiment, the user may browse through upcoming programs and pre-select which programs to add to the channel. Upon selecting the programs, the system provides the user the ability to add the same to one or more dedicated, personalized channels. This particular embodiment is helpful, for example, for parents who wish to specifically structure their child's television viewing. In this embodiment, the repackage module 330 receives such repackage requests from the input/output module 322 relatively directly as shown in FIG. 3. The repackage module 330 responds by creating adding the newly selected programs to the correct, personalized channel.

In yet another embodiment, the repackage module 330 does not create a new channel, per se. Instead, the repackage module acts as a filter. In this embodiment, the personalized "channel" or set of content based on time of day slots is created, either manually or automatically. Next, the repackage module 330, using an internal clock, automatically redirects the content provided to the retrieve module 318, effectively blocking all content but the requested content.

Figure 4:
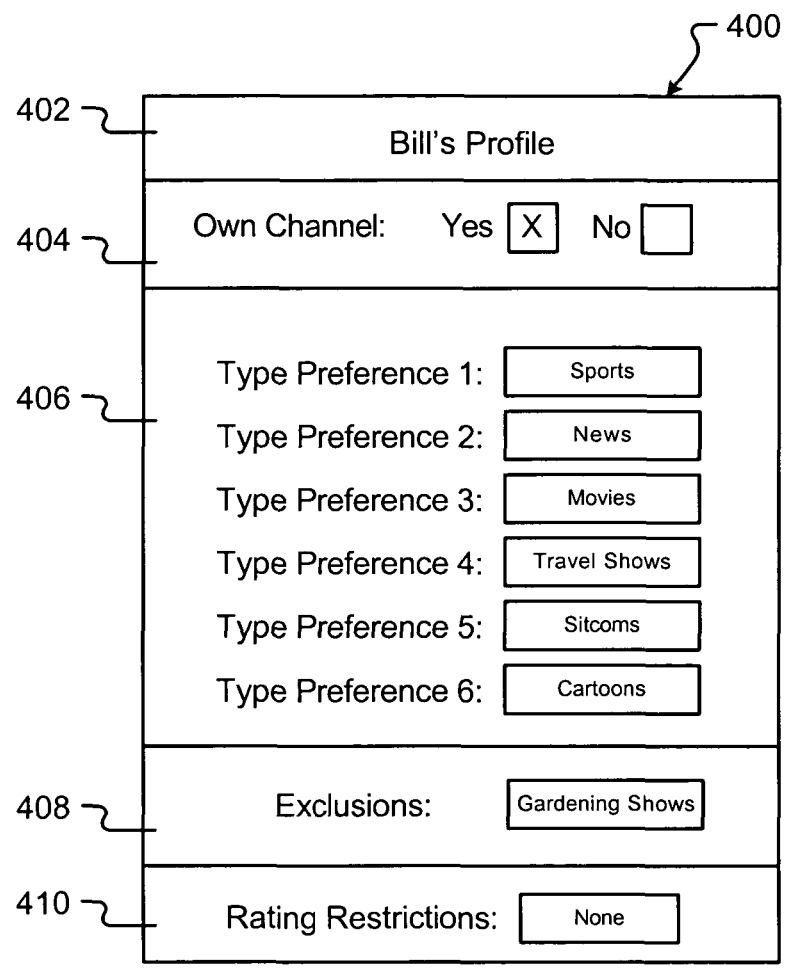
FIG. 4 illustrates exemplary incoming channels of programming content.

An example of a user profile 400 is shown in FIG. 4. The user profile 400 is only one example of potentially any number of different types and formats of user profiles and thus, the example 400 is only shown to illustrate some of the elements that may be associated with a particular user profile.

Initially, the user profile 400 has a title bar 402, which indicates the name of the user associated with the profile 400. Since it is contemplated that one or more profiles may be stored and used within one client system, such a title bar is useful in distinguishing the separate profiles. The title bar 402 is user friendly in that it may provide the name of the user, which is helpful as it is contemplated that users may access and edit their own profiles manually.

The profile 400 has a channel designation area 404. The channel designation area 404 designates whether the user associated with the profile 400 is to have a personalized channel established. In essence, if the designation area 404 indicates that the user desires a personalized channel, then repackage module 330 (FIG. 3) uses the information in the profile 400 to establish a new channel. However, if the designation area 404 indicates that the user associated with the profile 400 does not want a personalized channel, no personalized channel will be created. Importantly, however, the information in the profile 400 is still useful even if no new channel is to be created. For instance, in the case where no new channel is created, the information may still be used in creating and displaying a personalized and/or abbreviated programming guide.

Profile 400 further includes a preferences section 406. As shown in FIG. 4, the preferences section 406 has a list of preferences that the user associated with the profile 400 has selected. As may be appreciated, the user may manually select these preferences and/or the system 304 (FIG. 3) may automatically enter preferences based the user's previous history. Typically, the user manually enters the preference choices and is able to select the order in which preferences appear in the profile. In an embodiment, when two or more programs matching a user profile occur at the same time, then a content conflict exists. The comparison module 328 (FIG. 3) selects the content matching the highest preference as the content to enter into the channel in order to resolve the conflict. As may be appreciated, the preferences listed in profile 400 are general but other embodiments may have very detailed lists, with many more preferences in order to resolve conflicts. For instance, the preference lists in sports alone may list football before basketball before baseball and so on. The preference list may further indicate which news is preferable, such as "channel 9" news before "channel 7" news. As a result, the conflict resolution process is involved, but using the preference lists generated by the user and/or automatically, it is straightforward.

Profile 400 also includes an exclusion portion 408. The exclusion portion 408 lists the programming types that the user knows, ahead of time, that should not be entered in the channel or listed on the programming guide. For instance, in the example profile 400, the user has explicitly excluded gardening shows. Consequently, the comparison module 328 will not enter such shows in the user's channel. Such an exclusion portion 408 may be helpful in resolving conflicts. For example, assume that a user has indicated that sports are desirable but has not listed any one type of sport as preferable over another. Further assume that the user has explicitly excluded bowling and soccer using the exclusion area 408. In such a case, the system has more information to use in resolving conflicts since it can exclude all the bowling and soccer shows and concentrate on resolving conflicts related to concurrent sporting events.

Further such exclusion information 408 will not be shown in the programming guide in an embodiment. In alternative, multi-user embodiments, the programming guide may show such information if and only if another user profile has indicated that such shows should be shown on the programming guide. In such a multi-user environment, different groups of content or channels may be displayed based upon different user preferences, i.e., different profiles. Each profile is associated with different criteria for content selection. Such criterion for content selection is displayed in its own channel. In an embodiment, the channel may require unique access methods such as predetermined access codes or data entry to access one or more channels. For example, in one embodiment, certain channels or groups could only be accessed based upon direct entry of an access code. In another embodiment, the entry point may simply be the programming guide whereby the user would elect a uniquely named channel or grouping by selecting content associated with such channel names as such as "Alice's Channel", "Will's Sports", "Will's News", etc. In a television embodiment, the remote control might be used to make the selection. In other embodiments, other devices may be used, e.g., in a computer environment, a mouse or keyboard might be used.

The profile 400 also has a ratings restrictions area 410. This area allows the user to enter information related to the ratings that should be excluded from a user's profile. The information 410 typically acts as exclusion information, similar to the information entered in portion 408. As such, the system is able to resolve some conflicts by simply eliminating from consideration those programs that have been rated and have a rating that should be excluded.

As discussed above, the profile 400 may be done manually, wherein the user manipulates the input/output module 322 and the profile interface 320 to enter different selection criteria 406 and to save the data into a data structure 400. In other embodiments, the profile is created automatically, such as through the analysis of historical data. In such a case, the client system 304 records and stores data relating to previously watched content and uses the stored data to create and modify one or more profiles. Of course, in a multi-user environment, i.e., where more than one person uses the same client system 304, a user provides identification information such that the client system 304 recognizes which profile to update when using the automatic update feature.

Figure 5:
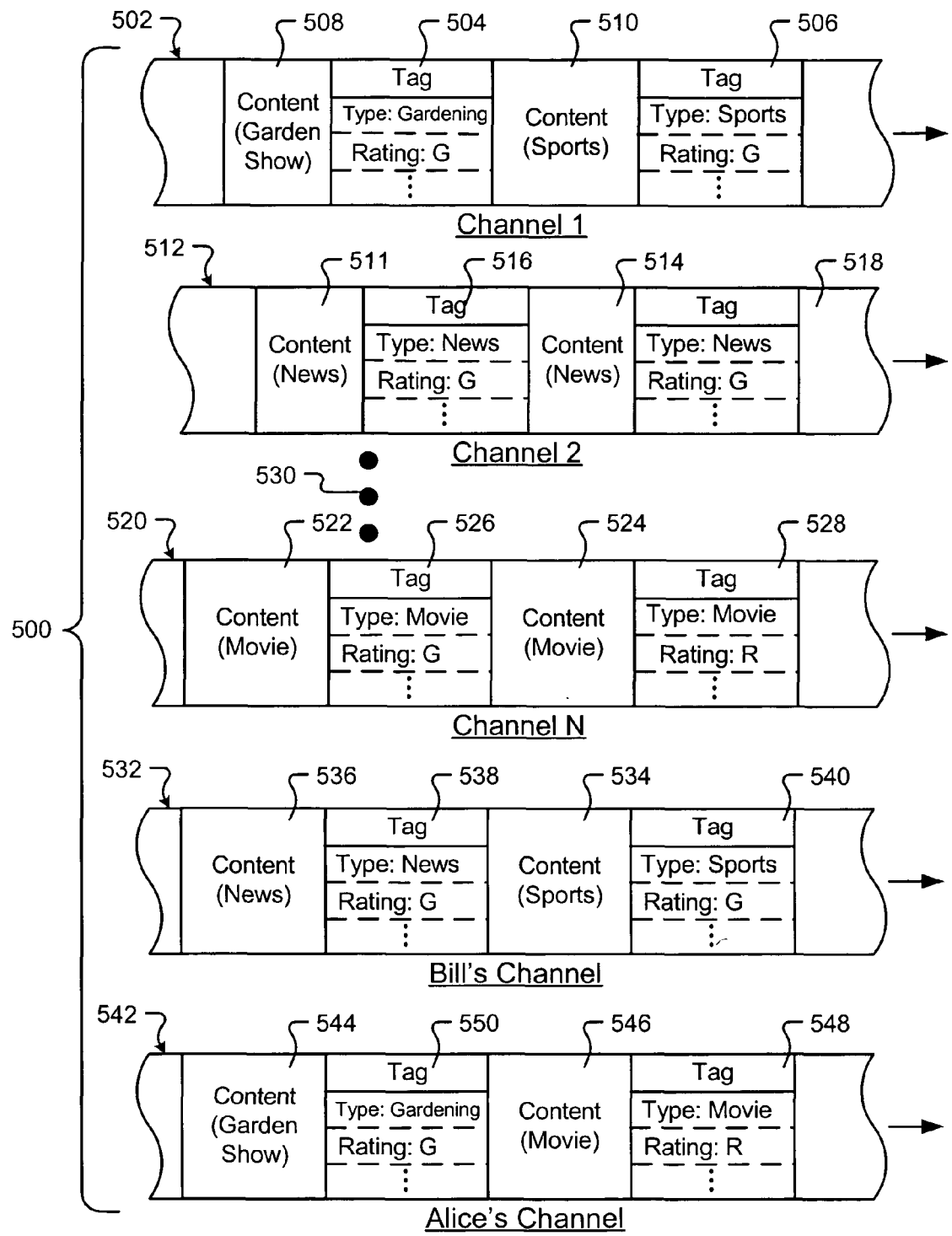
FIG. 5 illustrates exemplary outgoing channels of programming content.

As may be appreciated, many different channels of information may be received by the system 304 (FIG. 3). FIG. 5 illustrates channels 500 may that be delivered to a user in accordance with aspects of the present invention. In particular, FIG. 5 illustrates three exemplary predetermined channels 502, 512 and 520. Clearly, there can be any number N of predetermined channels as represented by the ellipsis 530. Channel 1 502, channel 2 512, and channel N 520 relate to channels of information provided by the server module, such as server module 302 shown in FIG. 3. Within each channel there are tags of information. As shown, channel 1 502 has tags 504 and 506, each related to content 508 and 510, respectively.

As may be appreciated, channel 1 502 contains multiple different types of programming, such as sports content 510 as well as garden show content 508. These content elements are merely examples of the many various types of content that may be provided by a particular channel and are not meant to be limiting. The purpose of showing different types is important due to the fact that a particular user may desire to watch one type of content, e.g. sports, and not another type of content, e.g. garden shows. Consequently, the channel 502 is not an ideal channel for continuous viewing for a particular user. Alternatively, a user may desire to watch garden shows and not sports and, therefore, channel 1 is not a desirable channel for that particular user for continuous viewing. Channel 2 512 is another channel received by the client device 304, as shown in FIG. 3. Channel 2 has content 512 and content 514 relating to news shows respectively. Each news show has its own tag 516 is associated with 512 and tag 518 is associated with 514.

Channel N, in this example, is an exemplary movie channel having movie content 522 and 524. As shown, movie content 522 has an associated tag 526 and movie content 524 has an associated tag 528. Also, as shown, the tag 526 has a rating G where content tag 528 has a rating R. These ratings provide the user and the system 304 (FIG. 3) an ability to determine the suitability of particular content for different users of different age groups or sensibilities.

FIG. 5 also illustrates two new, personalized channels 532 and 542. For example, Bill's channel 532 is a combination of content items 534 and content 536. Content 534 is a sports content item. In an embodiment the content news item 536 represents content news item 512 associated with channel 2. Also, content item 534 is a copy or the same content as content item 510 shown in part of channel 1 502. Also, it may be appreciated that tag 538 is associated with the content news item 536 and is, therefore, similar to content tag 516 as part of channel 2. Furthermore, tag 540 is associated with content item 534 and is, therefore, similar to tag item 506 part of channel 1.

The channel 532 is created by the analysis filter module 314 shown in FIG. 3. In essence the analysis module 314 uses information from profile 324 to gather and combine content items from other channels, e.g. channels 1 through N to create a specialized channel 32. In this embodiment the name of the channel is provided as Bill's channel.

As another example, Alice's channel 542 comprises content items 544 and 546. Content item 544 relates to garden-show content and is the same or a duplicate of content item 508 as part of channel 1.

In essence, the channel data can be provided to the user in a format that is different and separate from the format received by the client device 304 (FIG. 3).

Figure 6:
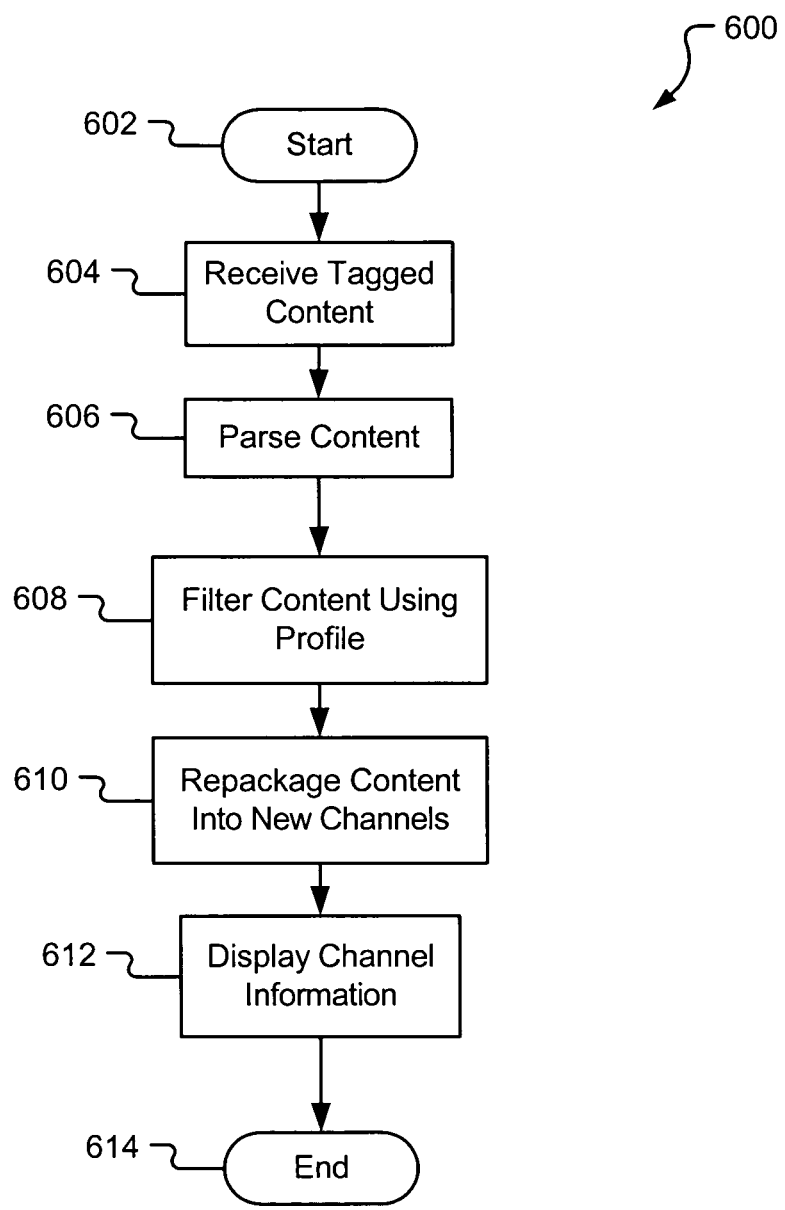
FIG. 6 is a flow diagram of functional aspects of the present invention.

FIG. 6 is a flow chart of functional operations implemented as part of an embodiment of the present invention. The flow chart 600 relates to the client device 304 and the operations performed therein in order to display channel information to a user. Flow 600 begins with start operation 602, which generally involves the beginning of the initialization process between a client, such as client 304, and its server, such as client 302, to begin the transfer of information from the server to the client. Prior to beginning flow operation 600, tagged information exists and has been packaged elsewhere.

Next, receive operation 604 receives tagged content. Receiving tagged content relates, in an embodiment, to the receipt of such information by the client device 304 from the server device 302 as depicted in FIG. 3. The actual transfer and receipt of such information may be accomplished using a variety of different protocols.

Upon receiving the tagged data stream information, parse operation 606 parses the data stream information. Parsing the data stream information relates to the analysis of the various streams of data and evaluating the tag information. Following the parse operation 606, filter operation 608 filters the content received from a server, such as server 302. Filter content evaluates tags and separates the content into multiple channels.

In order to filter the content into multiple channels, filter operation 608 compares profile information, from one or more user profiles, such as profile 400 (FIG. 4) to the tag information. Upon matching tag information with a profile preference, repackage operation 610 repackages the content, based on the results of the filter operation, into new channels of content. The new channels of content are available for viewing as any other predetermined channel.

Next, display operation 612 displays channel information. Display channel information 612 operation may involve displaying the channel information in the form of an electronic programming guide, as shown in FIG. 1. In another embodiment display operation 612 relates to displaying the actual content in the form of a channel. In an embodiment display operation 612 displays channel information on a dedicated channel wherein the content is associated with content that may be available on two or more other channels. For example, display channel information may display a content item on a dedicated channel that is also available as shown on a separate channel at the same time. Following the display of the content item, display operation may then display second content item that is also available on an alternative channel separate from the first alternative channel.

Following display operation 612, flow 600 ends with end operation 614.

The method steps illustrated in FIG. 6 may be implemented in firmware in a computer system. Additionally, the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules.

Using the above system and method, many benefits and features are realized. For instance, using embodiments of the above described invention allows a user to create a personalized programming guide and/or channel. Indeed, multiple personalized channels may be created for the same person or for multiple people. The system allows for manual creation/edition of a profile, or alternatively, automatic creation/edition of a profile or some combination of both. Further, although the system most likely will use the profile(s) to create and manage the personalized channel(s), the system allows for the manual management of the channel(s) to allow users to strictly control what programs are available on which personalized channels. Furthermore, the system allows users to require a password or other access code to view one or more channels.

It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

What is claimed is:

1. A method comprising:

receiving, by a system comprising a processor, content tag information prior to receiving predetermined channel content;

evaluating, by the system, the content tag information from a plurality of predetermined channels based on a stored profile of preferences for a user stored in a memory device, where the stored profile of preferences comprises exclusion information for excluding content of the predetermined content;

displaying, by the system, a personalized programming guide having a plurality of rows, each row associated with a respective channel and configured to contain a channel number, multiple time slots, and channel content information for each of the multiple time slots, wherein a section of the personalized programming guide displays available tagged channel content based on the stored profile in response to evaluating the content tag information;

generating a personalized channel based on the tagged channel content from the section of the personalized programming guide, wherein the personalized channel comprises a combination of content items gathered from the section of the personalized programming guide with the plurality of predetermined channels in accordance with the stored profile;

resolving a conflict of displaying the tagged channel content from two of the plurality of predetermined channels that match the stored profile occurring at a same time in the personalized channel by selecting the tagged channel content from one of the two of the plurality predetermined channels that matches a highest order preference in the stored profile;

generating in association with the personalized channel, a data stream comprising the preferred subset of available tagged channel content;

excluding, from the section of the personalized programming guide and from the personalized channel, channel content having content tag information that matches the exclusion information, and displaying the time slots that corresponding to the channel content excluded in the section of personalized programming guide and the personalized channel without any content information; and scrolling, by the system, through channels of the section of the personalized programming guide while the personalized channel is always viewable.

2. The method of claim 1, wherein the displaying of the personalized programming guide comprises displaying one of the plurality of rows associated with the personalized channel having the tagged channel content from a plurality of the predetermined channels.

3. The method of claim 1, wherein scrolling through channels of the personalized programming guide comprises continuously displaying the combination of content items within the multiple time slots of the personalized channel on a row of the personalized programming guide.

4. The method of claim 1, further comprising updating the stored profile of preferences responsive to an indication of a monitored consumption history.

5. The method of claim 1, wherein the evaluating of the personalized channel comprises parsing the plurality of predetermined channels to obtain content tag information.

6. The method of claim 1, wherein the generating of the personalized channel comprises repackaging of the predetermined channel content into the personalized channel.

7. A computer readable storage device having encoded thereon instructions that, when executed on a processor, cause the processor to perform operations comprising:

receiving content tag information prior to receiving predetermined channel content from a plurality of predetermined channels;

evaluating the content tag information based on a stored profile of preferences for a user, wherein the stored profile of preferences comprises exclusion information for excluding content of the predetermined channel content;

displaying a personalized programming guide having a plurality of rows of information, each row associated with a respective channel and configured to contain a channel number, multiple time slots, and channel content information for each of the multiple time slots, wherein a section of the personalized programming guide displays an available tagged channel content based on the stored profile;

generating a personalized channel based on the available tagged channel content from the section of the personalized programming guide, wherein the personalized channel comprises a combination of content items gathered from the section of the personalized programming guide with the predetermined channel content in accordance with the stored profile in response to evaluating the content tag information;

resolving a conflict of displaying the available tagged channel content from two of the plurality of predetermined channels that match the stored profile occurring at a same time in the personalized channel by selecting the available tagged channel content from one of the two of the plurality of predetermined channels that matches a highest order preference in the stored profile;

generating in association with the personalized channel, a data stream comprising a preferred subset of the available tagged channel content;

excluding, from the section of the personalized programming guide and from the personalized channel, content, resulting in excluded channel content, having content tag information that matches the exclusion information, and displaying the time slots that corresponding to the excluded channel content in the section of the personalized programming guide and the personalized channel without any content information; and scrolling through channels of the section of the personalized programming guide while the personalized channel is always viewable.

8. The computer readable storage device of claim 7, wherein the displaying of the personalized programming guide comprises displaying one of the plurality of rows associated with the personalized channel having the tagged content from the predetermined channel content.

9. The computer readable storage device of claim 7, wherein scrolling through channels of the personalized programming guide comprises continuously displaying a combination of content items within the multiple time slots of the personalized channel on a row of the personalized programming guide.

10. The computer readable storage device of claim 7, further comprising updating the stored profile of preferences responsive to an indication of a monitored consumption history.

11. The computer readable storage device of claim 7, wherein the evaluating of the personalized channel comprises parsing the predetermined channel content to obtain content tag information.

12. The computer readable storage device of claim 7, wherein the generating of the personalized channel comprises repackaging of the predetermined channel content into the personalized channel.

13. A device, comprising:
a memory to store computer instructions; and
a processor in communication with the memory, wherein the processor in response to executing the computer instructions, performs operations comprising:
receiving content tag information prior to receiving predetermined channel content;
evaluating the content tag information from a plurality of predetermined channels based on a stored profile of preferences for a user stored in a memory device, wherein the stored profile of preferences comprises exclusion information for excluding content of the predetermined content;
displaying a personalized programming guide having a plurality of rows, each row associated with a respective channel and configured to contain a channel number, multiple time slots, and channel content information for each of the multiple time slots, wherein a section of the personalized programming guide displays an available tagged channel content based on the stored profile in response to evaluating the content tag information;

generating a personalized channel based on the available tagged channel content from the section of the personalized programming guide, wherein the personalized channel comprises a combination of content items gathered from the section of the personalized programming guide with the plurality of predetermined channels in accordance with the stored profile;

resolving a conflict of displaying the available tagged channel content from two of the plurality of predetermined channels that match the stored profile occurring at a same time in the personalized channel by selecting the available tagged channel content from one of the two of the plurality predetermined channels that matches a highest order preference in the stored profile;

generating in association with the personalized channel, a data stream comprising the preferred subset of the available tagged channel content;

excluding, from the section of the personalized programming guide and from the personalized channel, channel content, resulting in excluded channel content, having content tag information that matches the exclusion information, and displaying the time slots that corresponding to the excluded channel content in the section of the personalized programming guide and the personalized channel without any content information; and scrolling through channels of the section of the personalized programming guide while the personalized channel is always viewable.

14. The device of claim 13, further comprising updating the stored profile of preferences responsive to an indication of a monitored consumption history.

15. The device of claim 13, wherein the evaluating of the personalized channel comprises parsing the plurality of predetermined channels to obtain content tag information.

16. The device of claim 13, wherein the generating of the personalized channel comprises repackaging of the predetermined channel content into the personalized channel.

17. The device of claim 13, wherein the displaying of the personalized programming guide comprises displaying one of the plurality of rows associated with the personalized channel having the tagged channel content from a plurality of the predetermined channels.

* * * * *